United States Patent [19]

Tagaya et al.

[11] Patent Number: 5,576,055
[45] Date of Patent: Nov. 19, 1996

[54] PHOTOCHROMIC MATERIAL, PHOTOCHROMIC THIN FILM, CLAY THIN FILM, AND THEIR PREPARATION

[75] Inventors: Hideyuki Tagaya, Yamagata; Tsuneo Kuwahara, Nagano, both of Japan

[73] Assignee: TDK Corporation, Tokyo, Japan

[21] Appl. No.: 466,132

[22] Filed: Jun. 6, 1995

Related U.S. Application Data

[62] Division of Ser. No. 118,297, Sep. 9, 1993, Pat. No. 5,474,715.

[30] Foreign Application Priority Data

Sep. 10, 1992 [JP] Japan ................. 4-268111
Sep. 10, 1992 [JP] Japan ................. 4-268112
Sep. 10, 1992 [JP] Japan ................. 4-268114
Nov. 5, 1992 [JP] Japan ................. 4-321134

[51] Int. Cl.$^6$ ............................... B05D 5/06
[52] U.S. Cl. ................. 427/162; 427/384; 430/17; 430/345; 430/962; 430/270.11
[58] Field of Search ................. 427/103, 384; 430/17, 270.11, 345, 962

[56] References Cited

U.S. PATENT DOCUMENTS

| | | | |
|---|---|---|---|
| 4,774,212 | 9/1988 | Drezdon | 502/62 |
| 4,913,544 | 4/1990 | Rickwood et al. | 351/163 |
| 5,250,279 | 10/1993 | Preston et al. | 423/432 |
| 5,252,437 | 10/1993 | Suzuki et al. | 430/17 X |

*Primary Examiner*—Michael Lusignan
*Attorney, Agent, or Firm*—Oblon, Spivak, McClelland, Maier & Neustadt, P.C.

[57] ABSTRACT

In a first form, photochromic material has anionic photochromic molecules and anionic polar molecules adsorbed between layers of anion-adsorptive inorganic layer-structured crystals. In a second form, photochromic material has neutral photochromic molecules and non-polar molecules adsorbed between layers of anion-adsorptive inorganic layer-structured crystals. The photochromic molecules are of anionic or neutral spiro-pyran compounds and the inorganic crystals are of hydrotalcite compounds. These photochromic materials in which anionic or neutral photochromic molecules remain thermally stable find application as optical recording material. In a third form, a photochromic thin film is available comprising a pyrolytically decomposed thin film of anion-adsorptive inorganic layer-structured crystals having anionic photochromic molecules and non-polar molecules adsorbed thereto. In a fourth form, a clay thin film is prepared by forming a thin film from an aqueous dispersion containing 0.1–5% by weight of a hydrotalcite group intercalation compound, drying the film, optionally heat treating the film for excluding a guest if any, and causing functional molecules such as photochromic molecules to be adsorbed between layers of the film.

25 Claims, No Drawings

PHOTOCHROMIC MATERIAL, PHOTOCHROMIC THIN FILM, CLAY THIN FILM, AND THEIR PREPARATION

This is a division, of application Ser. No. 08/118,297, filed on Sep. 9, 1993, now U.S. Pat. No. 5,474,715.

BACKGROUND OF THE INVENTION

1. Field of the Invention

This invention relates to a photochromic material which is of interest as one of photon mode recording materials and a method for preparing the same. It also relates to a photochromic thin film. It further relates to a clay thin film capable of adsorbing functional molecules such as photochromic molecules as a guest, a clay thin film having functional molecules adsorbed thereto, and a method for preparing the same.

2. Prior Art

Great attention is now paid to photon mode recording materials as a next generation of optical recording material capable of super-high density recording. Active research efforts have been made on photochromic materials although the technology has not matured to a practically acceptable level because of many outstanding problems including colorant. stability, non-destructive reading, and repetitive durability.

Spirobenzopyrans which form a class of photochromic materials have characteristics including a great difference in absorption spectrum before and after light exposure and development of various colors by a choice of substituents, but suffer from low thermal stability. Then attempts have been made to disperse spiro-benzopyrans in resin binders, but at the sacrifice of the rate of recording, reading and erasing and hence, the performance as optical recording material.

For this and other reasons, Japanese Patent Publication (JP-B) No. 16776/1992 discloses an optical recording material having spiro-benzopyrans dispersed in a film having a composite layered structure including a clay and a bimolecular membrane resulting from an ionic complex of a cationic surfactant having a linear higher alkyl group and an anionic layer-structured clay compound. The anionic layer-structured clay compound used in this publication is an ion exchangeable silicate capable of intercalating a cationic organic compound between layers thereof, for example, montmorillonite. Several spiro-benzopyrans are described, but anionic ones are not disclosed. It is described that the bimolecular membrane exhibits phase transition behavior between clay layers and that the film assumes a lamellar crystal state having low molecular kinetic energy at low temperatures below the phase transition temperature, but a smectic liquid crystal state having high molecular kinetic energy at high temperatures above the phase transition temperature. This enables rapid recording at high temperatures above the phase transition temperature and stable storage of recorded information at low temperatures below the phase transition temperature. However, only a limited degree of freedom of design is allowed because the combination of a cationic surfactant and an anionic layer-structured clay compound capable of forming an ionic complex is restricted.

According to Japanese Patent Application Kokai (JP-A) No. 264246/1990, spiro-pyrans are readily carried on a solid phase matrix in a stable manner by using cationic spiropyrans and silicate minerals having a three layer structure (smectite group mineral) such as montmorillonite as the matrix. This proposal, however, fails to improve the stability of anionic and neutral spiro-pyran compounds themselves, limits being imposed on the selection of substituents and color generation.

JP-A 151142/1992 discloses a method of forming a thin film of an ionic complex by forming an ionic complex from a photochromic substance having an anionic group and a cationic surfactant and forming a thin film of the ionic complex by the Langmuir-Brodgett technique. With the Langmuir-Brodgett technique, it is difficult to form a uniform film of a large surface area and to produce it on an industrial large scale.

There is a need to improve the thermal stability of anionic and neutral photochromic molecules for improving their characteristics as optical recording material.

The invention further relates to a clay thin film capable of adsorbing functional molecules such as photochromic molecules as a guest, a clay thin film having functional molecules adsorbed thereto as the guest, and a method for preparing the same.

Many attempts have been made to insert organic functional substances between layers of inorganic layer-structured crystal materials such as clay minerals so as to form intercalation compounds exhibiting new functions. The materials are in powder form in most of these attempts. For commercially acceptable application of such intercalation compounds, it is important to form a thin film which can find a wider range of application. If a transparent thin film is available, a wide range of optical application is expectable.

In JP-B 16776/1992 referred to above, the intercalation compound is cast to form a film of 0.01 mm thick. In JP-A 264246/1990 referred to above, the matrix having the spiropyran adsorbed thereto is subject to centrifugal separation. The precipitate is passed through a membrane filter under vacuum and dried under vacuum at room temperature. A pale yellow clay/spiro-pyran composite film is then stripped from the filter. However, such a thin film of the smectite mineral is less transparent. Where it is desired to use the thin film in an optical application, for example, as a photochromic thin film, it offers no satisfactory S/N. Since it is not expectable from the prior art techniques to improve the stability of anionic and neutral spiro-pyran compounds themselves, limits are imposed on the selection of substituents and color generation.

SUMMARY OF THE INVENTION

Therefore, an object of the present invention is to improve the thermal stability of anionic photochromic molecules for improving their characteristics as optical recording material.

Another object of the present invention is to improve the thermal stability of neutral photochromic molecules for improving their characteristics as optical recording material.

A further object of the present invention is to provide a clay thin film having high transparency and capable of adsorbing functional molecules to form an intercalation compound and a functional clay thin film comprising such a clay thin film having functional molecules adsorbed thereto.

In a first form of the invention, there is provided a photochromic material in which anionic photochromic molecules and anionic polar molecules are adsorbed between layers of inorganic layer-structured crystals having anion adsorptivity. Preferably, the anionic photochromic molecules are of a spiro-pyran compound. The anionic polar molecules are of an organic compound having a sulfone group. The inorganic layer-structured crystals are of a hydrotalcite group compound.

The photochromic material in the first form is prepared by causing anionic photochromic molecules and anionic polar molecules to be adsorbed between layers of inorganic layer-structured crystals having anion adsorptivity. Alternatively, the photochromic material is prepared by causing anionic polar molecules to be adsorbed between layers of inorganic layer-structured crystals having anion adsorptivity and then causing anionic photochromic molecules to be adsorbed between the layers. Preferably, ultrasonic waves are applied during adsorption of anionic photochromic molecules between layers.

In a second form of the invention, there is provided a photochromic material in which neutral photochromic molecules and non-polar molecules are adsorbed between layers of inorganic layer-structured crystals having anion adsorptivity. Preferably, the neutral photochromic molecules are of a spiro-pyran compound. The inorganic layer-structured crystals are of a hydrotalcite group compound.

The photochromic material in the second form is prepared by the first step of intercalating anionic polar molecules into inorganic layer-structured crystals having anion adsorptivity for expanding the spacing between layers of the crystals, and the second step of causing neutral photochromic molecules and non-polar molecules as a solvent therefor to be adsorbed between layers of the crystals. Preferably, ultrasonic agitation is effected during the adsorption step. The anionic polar molecules are of an organic compound having a sulfone group.

In a third form of the invention, there is provided a photochromic thin film comprising a pyrolytically decomposed thin film of inorganic layer-structured crystals having anion adsorptivity. The thin film has anionic photochromic molecules and non-polar molecules adsorbed thereto. Preferably, the anionic photochromic molecules are of a spiro-pyran compound. The inorganic layer-structured crystals are of a hydrotalcite group compound. The non-polar molecules are of an aromatic hydrocarbon.

The photochromic thin film in the third form is prepared by dipping a pyrolytically decomposed thin film of inorganic layer-structured crystals having anion adsorptivity in a reaction solution of anionic photochromic molecules in a non-polar solvent, for allowing the anionic photochromic molecules and non-polar molecules to be adsorbed to the thin film. Preferably, the pyrolytically decomposed thin film is prepared by forming a thin film from an aqueous dispersion of fine particles of the inorganic layer-structured crystals having anion adsorptivity, followed by drying and heat treatment. The aqueous dispersion contains 0.1 to 5% by weight of the inorganic layer-structured crystals. The heat treatment is by heating the thin film at a temperature of 400 to 600° C. for 0.1 to 5 hours.

In a fourth form of the invention, there is provided a clay thin film comprising a hydrotalcite group compound. Preferably, the clay thin film has a thickness of at least 0.1 µm and an optical density of up to 1000 cm$^{-1}$ in the visible light range.

The clay thin film in the fourth form is prepared by forming a thin film from an aqueous dispersion containing 0.1 to 5% by weight of a hydrotalcite group intercalation compound having a guest species between layers thereof, drying the film, and heat treating the film for excluding at least a part of the guest species from between the layers.

Such a clay thin film wherein the hydrotalcite group compound is a host of an intercalation compound is prepared by forming a thin film from an aqueous dispersion containing 0.1 to 5% by weight of a hydrotalcite group intercalation compound and drying the film. Also a clay thin film wherein the hydrotalcite group compound is contained as a host of an intercalation compound is also prepared by forming a thin film from an aqueous dispersion containing 0.1 to 5% by weight of a hydrotalcite group intercalation compound having a guest species between layers thereof, drying the film, heat treating the film for excluding the guest species, and causing another guest species to be adsorbed between layers of the hydrotalcite group compound. Alternatively a clay thin film wherein the hydrotalcite group compound is contained as a host of an intercalation compound is also prepared by carrying out guest exchange in an aqueous dispersion containing 0.1 to 5% by weight of a hydrotalcite group intercalation compound, forming a thin film from the dispersion and drying the film.

A clay thin film wherein anionic photochromic molecules and anionic polar molecules are contained as guest species in the hydrotalcite group compound and/or the photochromic molecules are of a spiro-pyran compound is prepared by forming a thin film from an aqueous dispersion containing 0.1 to 5% by weight of a hydrotalcite group intercalation compound, drying the film, and causing anionic photochromic molecules and anionic polar molecules to be adsorbed between layers of the hydrotalcite group compound. Preferably, the hydrotalcite group compound having a guest species between layers thereof, and after the drying step and before the adsorption step, the film is heat treated for excluding at least a part of the guest species from between the layers.

A clay thin film wherein neutral photochromic molecules and non-polar molecules are contained as guest species in the hydrotalcite group compound and/or the photochromic molecules are of a spiro-pyran compound is prepared by forming a thin film from an aqueous dispersion containing 0.1 to 5% by weight of a hydrotalcite group intercalation compound, drying the film, causing anionic polar molecules to be adsorbed between layers of the hydrotalcite group compound, and thereafter, causing neutral photochromic molecules and non-polar molecules as a solvent therefor to be adsorbed between layers of the hydrotalcite group compound. Preferably, the hydrotalcite group compound having a guest species between layers thereof, and after the drying step and before the first adsorption step, the film is heat treated for excluding at least a part of the guest species from between the layers.

DESCRIPTION OF THE PREFERRED EMBODIMENTS

First Embodiment.

According to the first embodiment of the present invention, anionic photochromic molecules, typically of an anionic spiro-pyran compound and anionic polar molecules having a sulfone or similar group are intercalated into layers of inorganic layer-structured crystals having anion adsorptivity, typically of a hydrotalcite group compound. It is true that a hydrotalcite group compound can have intercalated therein an anionic spiro-pyran compound, but little definite photo-chromism is exerted. Quite unexpectedly, when both an anionic spiro-pyran compound and an anionic polar compound are co-adsorbed in a hydrotalcite group compound, there is obtained a material capable of developing definite photochromism and having improved thermal stability of the colorant. Though not bound to the theory, photochromism is exerted by co-adsorption of anionic polar molecules because the spiro-pyran compound is increased in mobility by this co-adsorption so that a characteristic change by light becomes reversible.

The first embodiment of the invention is described in more detail.

The photochromic material according to the first embodiment of the present invention is an intercalation compound in which anionic photochromic molecules and anionic polar molecules are adsorbed between layers of inorganic layer-structured crystals having anion adsorptivity.

The inorganic layer-structured crystals having anion adsorptivity are generally those crystals of hydrotalcite group compounds and graphite, with the hydrotalcite group compounds being preferred. The hydrotalcite group compounds are clay minerals having octahedral sheets comprised of $MgO_6$, $ZnO_6$, etc. and $AlO_6$ wherein the layer-structured skeleton becomes cationic by substituting $Al^{3+}$ for $Mg^{2+}$ and $Zn^{2+}$. Thus they can take in inorganic anions and anionic organic molecules between layers. These hydrotalcite group compounds are described in the literature, for example, Hyomen (Surface), Vol. 30, No. 7, 598–607 (1992).

Although the hydrotalcite group compounds used herein are not particularly limited, magnesium-aluminum hydrotalcite group compounds are preferred. When carbonate ions are intercalated into layers, the magnesium-aluminum hydrotalcite group compounds are represented by the formula: $[Mg_{1-x}Al_x(OH)_2](CO_3)_{x/2}$ wherein x is from 0.2 to 0.33. The magnesium-aluminum hydrotalcite group compounds having ions intercalated into layers have a unit layer of the following structure (1).

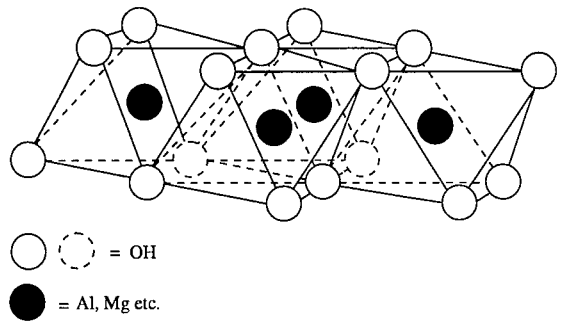

○ ◌ = OH

● = Al, Mg etc.

The anionic photochromic molecule may be selected from cis-trans isomers such as azo dyes and indigo dyes, ring-closing reaction type compounds such as fulgides, and ring-opening reaction type compounds such as spiro-pyran compounds, with the spiro-pyran compounds being preferred for satisfactory photochromic characteristics. Preferred spiro-pyran compounds are spiro-benzopyran compounds of the following formula (2).

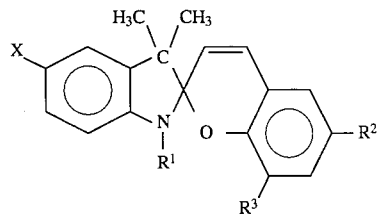

In formula (2), X, $R^1$, $R^2$, and $R^3$ are appropriately selected from the group consisting of a hydrogen atom, halogen atom, sulfone group, carboxyl group, phosphate group, nitro group, hydroxyl group, alkyl group, alkylcarbonyl group, alkylsulfonyl group, alkoxy group, and alkylcarbonyloxy group, at least one of X, $R^1$, $R^2$, and $R^3$ being a group exhibiting anionic nature. The alkyl groups represented by X or Rs are preferably those having 1 to 5 carbon atoms and may have a substituent such as a sulfone group, carboxyl group, phosphate group, nitro group, hydroxyl group and amino group. The sulfone group represented by X or Rs may form a salt with an amine such as triethylamine.

More particularly, useful are those compounds having a group exhibiting anionic nature such as a sulfone, carboxyl or phosphate group or a group containing such a group in at least of X, $R^1$, $R^2$, and $R^3$. Exemplary compounds are shown in Table 1 wherein the headings X, $R^1$, $R^2$, and $R^3$ correspond to those in formula (2).

TABLE 1

| | | (anionic) | | |
|---|---|---|---|---|
| No. | X | $R^1$ | $R^2$ | $R^3$ |
| 1 | H | —$C_2H_4COOH$ | $NO_2$ | H |
| 2 | H | —$(CH_2)_3SO_3H.TA$ | $NO_2$ | H |
| 3 | H | —$(CH_2)_3SO_3H$ | $NO_2$ | $CH_3O$ |
| 4 | H | $CH_3$ | $SO_3H$ | H |
| 5 | H | —$C_2H_4COOH$ | Br | H |
| 6 | H | —$C_2H_4COOH$ | H | H |
| 7 | H | $CH_3$ | H | COOH |
| 8 | H | $CH_3$ | H | $SO_3H$ |
| 9 | $CF_3$ | —$C_2H_4SO_3H$ | H | H |
| 10 | H | $SO_3H$ | H | COOH |

*TA in $R^1$ of No. 2 compound represents triethylamine.

The anionic polar molecules used herein are preferably organic molecules, for example, of various organic acids such as aromatic and aliphatic sulfonic acids and carboxylic acids. Preferably they are selected from benzenesulfonic acid, toluenesulfonic acid, naphthalenesulfonic acid, ethanesulfonic acid, propanesulfonic acid, and derivatives thereof such as naphtholsulfonic acid and sulfanilic acid as well as benzoic acid, naphthoic acid, fatty acids and derivatives thereof. Preferably the photochromic material of the invention is prepared by the following method. First a powder of anion adsorptive inorganic layer-structured crystals having a particle size of about 50 to 300 μm, photochromic molecules and anionic polar molecules are added to water and dispersed or dissolved therein to form a reaction solution. The anionic polar molecules and photochromic molecules are mixed in such a molar ratio that the anionic polar molecules are excessive. The reaction solution is then heated at about 40 to 80° C. for about 1 to 100 hours for allowing reaction to take place, that is, allowing photochromic molecules and anionic polar molecules to be co-adsorbed between layers of the inorganic layer-structured crystals. The reaction is preferably carried out in an inert gas atmosphere. Finally, the intercalation compound is separated from the reaction solution and dried, yielding a photochromic material. Where a hydrotalcite group compound is used as the inorganic layer-structured crystals, it may be in the form of an intercalation compound from which the guest species may be partially or entirely excluded if desired. The guest species can be excluded from the intercalation compound by heating it, preferably at a temperature of 400 to 600° C. for about 1 to 5 hours.

Alternatively, anionic polar molecules are first adsorbed between layers of inorganic layer-structured crystals in aqueous solution and the crystals are dried. Thereafter, photochromic molecules are adsorbed between layers of the inorganic layer-structured crystals in aqueous solution.

In either of the above-mentioned methods, ultrasonic waves are preferably applied during adsorption of photochromic molecules. Ultrasonic agitation completes adsorption within a short time.

Formation of an intercalation compound can be ascertained by X-ray diffractometry, Fourier transform infrared spectroscopy (FTIR) or the like, and the quantity of intercalation between layers can be measured by gas analysis, thermal analysis or the like. The total amount of photochromic molecules and anionic polar molecules adsorbed in inorganic layer-structured crystals is about 0.1 to 3 meq/g.

All the starting materials, inorganic layer-structured crystals with anion adsorptivity, anionic photochromic compound and anionic polar compound can be prepared by conventional processes or are commercially available.

Second Embodiment.

According to the second embodiment of the present invention, neutral photochromic molecules, typically of an neutral spiro-pyran compound and non-polar molecules, typically of toluene are intercalated into layers of inorganic layer-structured crystals having anion adsorptivity, typically of a hydrotalcite group compound. It is difficult to directly insert a neutral spiro-pyran compound into layers of a hydrotalcite group compound. Thus the second embodiment employs two steps. In the first step, anionic polar molecules having a sulfone or similar group are intercalated for expanding the spacing between layers of the hydrotalcite group compound. Then in the second step, non-polar molecules and a neutral spiro-pyran compound are intercalated into layers of the hydrotalcite group compound. The first step must be followed by the second step. It is to be understood that the non-polar molecules of toluene or the like are used as a solvent for the neutral spiro-pyran compound. The anionic polar molecules once intercalated in the first step are at least partially replaced by the non-polar molecules and neutral spiro-pyran molecules in the second step. An intercalation compound exhibiting definite photochromism is obtained in this way.

If a polar solvent is used in the second step, the neutral spiro-pyran compound can be inserted, but no photochromism is developed. Though not bound to the theory, photochromism is exerted by co-adsorption of non-polar molecules because the spiro-pyran compound is increased in mobility by this coadsorption so that a characteristic change by light becomes reversible.

The second embodiment of the invention is described in more detail.

The photochromic material according to the second embodiment of the present invention is an intercalation compound in which neutral photochromic molecules and non-polar molecules are adsorbed between layers of inorganic layer-structured crystals having anion adsorptivity.

The inorganic layer-structured crystals having anion adsorptivity are the same as described in the first embodiment.

The neutral photochromic molecule may be selected from cis-trans isomers such as azo dyes and indigo dyes, ring-closing reaction type compounds such as fulgides, and ring-opening reaction type compounds such as spiro-pyran compounds, with the spiro-pyran compounds being preferred for satisfactory photochromic characteristics. Preferred spiro-pyran compounds are spiro-benzopyran compounds of the following formula (2).

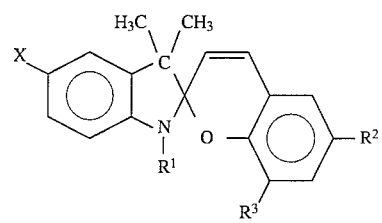

In formula (2), X, $R^1$, $R^2$, and $R^3$ are appropriately selected such that the compound is neutral as a whole. Exemplary preferred groups include a hydrogen atom, halogen atom, nitro group, hydroxyl group, alkyl group, alkylcarbonyl group, alkylsulfonyl group, alkoxy group, and alkylcarbonyloxy group. The alkyl groups represented by X or Rs are preferably these having 1 to 5 carbon atoms and may have a substituent such as a nitro and hydroxyl group.

Exemplary compounds are shown in Table 2 wherein the headings X, $R^1$, $R^2$, and $R^3$ correspond to those in formula (2).

TABLE 2

| | (neutral) | | | |
| No. | X | $R^1$ | $R^2$ | $R^3$ |
| --- | --- | --- | --- | --- |
| 11 | H | $CH_3$ | $NO_2$ | H |
| 12 | H | $CH_3$ | Br | H |
| 13 | H | $CH_3$ | H | $CH_3O$ |
| 14 | H | $CH_3$ | i-$C_3H_7$ | $NO_2$ | H |
| 15 | $C_2H_5COO$ | $CH_3$ | $NO_2$ | H |
| 16 | $CH_3SO_2$ | $CH_3$ | $NO_2$ | $CH_3O$ |
| 17 | Cl | $C_2H_5$ | $NO_2$ | H |
| 18 | I | $CH_3$ | $NO_2$ | H |
| 19 | H | $CH_3$ | OH | H |
| 20 | H | $CH_3$ | Br | $NO_2$ |

The non-polar molecules used herein serve as a solvent during adsorption of neutral photochromic molecules and are inserted between layers of the hydrotalcite compound at the same time as are neutral photochromic molecules. The non-polar molecules are preferably selected from cyclic compounds such as benzene, toluene, xylene and cyclohexane, aliphatic hydrocarbons which are liquid at room temperature and halogenated ones thereof, ketones such as acetone, and tetrahydrofuran though not limited thereto.

Preferably the photochromic material of the invention is prepared by a two-step method. In the first step, anionic polar molecules are inserted into anion adsorptive inorganic layer-structured crystals for expanding the spacing between layers of the crystals. In the subsequent second step, neutral photochromic molecules and non-polar molecules as a solvent therefor are adsorbed between layers of the crystals.

The anionic polar molecules used in the first step are preferably organic molecules, for example, of various organic acids such as aromatic and aliphatic sulfonic acids and carboxylic acids. Preferably they are selected from benzenesulfonic acid, toluenesulfonic acid, naphthalenesulfonic acid, ethanesulfonic acid, propanesulfonic acid, and derivatives thereof such as naphtholsulfonic acid and sulfanilic acid as well as benzoic acid, naphthoic acid, fatty acids and derivatives thereof.

In the first step, a powder of anion adsorptive inorganic layer-structured crystals having a particle size of about 50 to 300 μm and anionic polar molecules are added to water and dispersed or dissolved therein to form a reaction solution. The reaction solution is then heated at about 40 to 80° C. for about 1 to 100 hours for allowing reaction to take place, that is, allowing anionic polar molecules to be adsorbed between layers of the inorganic layer-structured crystals. The reaction is preferably carried out in an inert gas atmosphere. Where a hydrotalcite group compound is used as the inorganic layer-structured crystals, it may be in the form of an intercalation compound from which the guest species may be partially or entirely excluded if desired. The guest species can be excluded from the intercalation compound by heating it, preferably at a temperature of 400 to 600° C. for about 1 to 5 hours.

Next, the resulting intercalation compound is separated from the reaction solution and dried before the second step is started. In the second step, the powder of the intercalation compound having anionic polar molecules adsorbed therein and neutral photochromic molecules are added to a solvent consisting of non-polar molecules and dispersed therein to form a reaction solution. Reaction is then effected under substantially the same conditions as in the first step to perform guest exchange. Then photochromic molecules and non-polar molecules as the solvent are co-adsorbed between layers of the inorganic layer-structured crystals instead of at least some of the anionic polar molecules. The resulting intercalation compound is ready for use as a photochromic material in a wet state in the presence of the non-polar solvent. If desired, the intercalation compound is separated from the reaction solution and dried into a powder.

In the second step, ultrasonic waves are preferably applied during adsorption of photochromic molecules. Ultrasonic agitation completes adsorption within a short time.

Formation of an intercalation compound can be ascertained by X-ray diffractometry, FTIR or the like, and the quantity of intercalation into layers can be measured by gas analysis, thermal analysis or the like. The amount of anionic polar molecules adsorbed in inorganic layer-structured crystals is about 0.1 to 3 meq/g. The total amount of photochromic molecules and non-polar molecules adsorbed in inorganic layer-structured crystals is about 0.1 to 2 meq/g.

All the starting materials, inorganic layer-structured crystals with anion adsorptivity, neutral photochromic molecule, anionic polar molecule, and non-polar molecule can be prepared by conventional processes or are commercially available.

Third Embodiment

According to the third embodiment of the present invention, anionic photochromic molecules, typically of an anionic spiro-pyran compound and non-polar molecules, typically of an aromatic hydrocarbon are adsorbed to a pyrolytically decomposed thin film of inorganic layer-structured crystals having anion adsorptivity, typically of a hydrotalcite group compound. It is true that a hydrotalcite group compound can have adsorbed therein an anionic spiro-pyran compound, but little definite photochromism is exerted by such single adsorption. Quite unexpectedly, when both an anionic spiro-pyran compound and a non-polar compound are co-adsorbed in a hydrotalcite group compound, there is obtained a material capable of developing definite photochromism and having improved thermal stability of the colorant. It is to be understood that the non-polar molecules are used as a solvent for the anionic photochromic molecules. Though not bound to the theory, photochromism is exerted by co-adsorption of non-polar molecules because the spiro-pyran compound is increased in mobility by this co-adsorption so that a characteristic change by light becomes reversible.

The pyrolytically decomposed inorganic layer-structured crystals to which photochromic molecules are adsorbed are given in the form of a thin film, especially a high transparency thin film when a hydrotalcite group compound is used. The thin film offers remarkably improved S/N and contrast since it does not obstruct the action of photochromic molecules.

The third embodiment of the invention is described in more detail.

According to the third embodiment of the present invention, the photochromic thin film is comprised of a pyrolytically decomposed thin film of anion adsorptive inorganic layer-structured crystals, anionic photochromic molecules and non-polar molecules being adsorbed to the thin film.

The anion adsorptive inorganic layer-structured crystals, typically hydrotalcite group compounds are as described in the first embodiment.

The anionic photochromic molecules are as described in the first embodiment.

The non-polar molecules used herein serve as a solvent during adsorption of anionic photochromic molecules and are adsorbed to the hydrotalcite compound at the same time as are anionic photochromic molecules. The non-polar molecules are preferably selected from cyclic compounds such as benzene, toluene, xylene and cyclohexane, aliphatic hydrocarbons which are liquid at room temperature and halogenated ones thereof, ketones such as acetone, and tetrahydrofuran though not limited thereto.

Preferably the photochromic thin film of the embodiment is prepared by the following method. The following description refers to the preferred embodiment wherein the inorganic layer-structured crystals are of a hydrotalcite group compound.

First anionic photochromic molecules are dissolved in a non-polar solvent to form a reaction solution, in which a pyrolytically decomposed thin film of a hydrotalcite compound is dipped.

The pyrolytically decomposed thin film is prepared by forming a thin film from an aqueous dispersion of fine particles of the hydrotalcite compound, followed by drying and heat treatment. The aqueous dispersion preferably contains 0.1 to 5% by weight of the hydrotalcite compound because within this concentration range, a film of a large surface area can be formed without cracks or failure. Below the range, it would become difficult to form a uniform film. Beyond the range, cracks would be often introduced in a film upon drying.

A film may be formed from the aqueous dispersion by any desired method of forming a uniform film, for example, a method of coating the dispersion on a support by dipping, spin coating, or casting. The support used herein may be made of glass, ceramics and resins insofar as it is a heat resistant material capable of withstanding heat treatment to be done after film formation.

Preferably the thin film has a thickness of at least 0.1 μm. It is difficult with normal care to form a uniform film of less than 0.1 μm thick. The upper limit of the film thickness is not critical although it is usually up to 100 μm. There is a tradeoff between the fact that more of anionic photochromic molecules are adsorbed as the film thickness increases and the fact that a thicker film of a large surface area tends to crack. Where it is desired to form a thicker film, the film should preferably be divided into sections of smaller surface area for preventing cracking. More particularly, in applications intended for optical disks, the support is formed with a spiral groove or concentric grooves where a thin film is formed. In applications intended for image display panels, the support is formed with recesses of rectangular or circular shape corresponding to respective picture elements and a thin film is formed in the recesses.

The thus formed thin film is comprised of the hydrotalcite compound as the host having a guest species such as a carbonate ion adsorbed between layers thereof, that is, an intercalation compound.

The thin film is then heat treated to expel at least a part of the guest species such as carbonate ion. Heat treatment is preferably done at a temperature of 400 to 600° C. for 0.1 to 5 hours. Exclusion of the guest species would be insufficient at lower temperatures or in shorter times. Higher temperatures or longer times are less desirable because the thin film or support can be stressed to induce cracking or stripping of the thin film. Also a choice of the support material is limited.

In the heat treated thin film, the hydrotalcite compound loses at least a part of the guest species and has a structure which has been partially changed due to pyrolytic decomposition. It can be ascertained by X-ray diffractometry that the film as heat treated is a pyrolytically decomposed, structurally changed product of the hydrotalcite compound. More particularly, a contraction in the spacing between layers of layer-structured crystals is observable. The peak characteristic of the hydrotalcite compound disappears and instead, a peak indicating the conversion to a rock salt structure appears.

The pyrolytically decomposed thin film of the hydrotalcite compound resulting from heat treatment is immersed in the reaction solution of anionic photochromic molecules in a non-polar solvent and kept immersed for allowing the anionic photochromic molecules and non-polar solvent molecules to be adsorbed to the pyrolytically decomposed thin film. In this regard, the reaction solution is preferably at a temperature of about 0 to 80° C. and the holding time is about 0.1 to 10 hours. Reaction in an inert gas atmosphere is desirable. The concentration of the reaction solution is not particularly limited and may be determined so as to ensure that the photochromic compound be stably dissolved.

The photochromic thin film of the invention is highly transparent since it is predominantly comprised of a pyrolytically decomposed product of the hydrotalcite compound. More particularly, it can have an optical density of up to 1000 $cm^{-1}$ in the visible range (wavelength about 400 to 800 nm) when it is free of photochromic molecules and non-polar molecules.

All the starting materials, anion adsorptive inorganic layer-structured crystals, anionic photochromic molecule and non-polar molecule can be prepared by conventional processes or are commercially available.

Fourth Embodiment

The fourth embodiment of the invention is directed to a clay thin film comprising a hydrotalcite group compound. Due to the presence of the hydrotalcite group compound, the clay thin film has very high transparency, typically an optical density of up to 1000 $cm^{-1}$ in the visible light range. Where functional molecules having useful optical characteristics are adsorbed to the thin film, these molecules can exert their function without interference. Where the functional molecules used are photochromic molecules, for example, the film shows well improved S/N and contrast. The functional molecules are improved in stability since they are inserted between layers of the hydrotalcite group compound.

The clay thin film in the fourth embodiment is prepared by forming a thin film from an aqueous dispersion containing a hydrotalcite group intercalation compound, followed by drying. When the thin film is contacted with a solution of functional molecules, guest exchange reaction takes place to replace the guest in the hydrotalcite group compound by the functional molecules, forming a functional thin film. Depending on its type, the intercalation compound may be heat treated for excluding the guest from between layers thereof before functional molecules are adsorbed because the intercalation compound in which the guest between layers thereof has been excluded by heat treatment is more likely to adsorb functional molecules. By controlling the concentration of a hydrotalcite group intercalation compound in an aqueous dispersion to the range of 0.1 to 5% by weight, a thin film of large surface area can be formed without cracking.

The fourth embodiment of the invention is described in more detail.

The clay thin film contains a hydrotalcite group compound. Contemplated in the fourth embodiment are a clay thin film which is a carrier for adsorbing functional molecules such as photochromic molecules and a clay thin film having functional molecules adsorbed thereto, that is, a clay thin film in which a hydrotalcite group compound forms an intercalation compound with functional molecules. First the clay thin film as a carrier is described.

The hydrotalcite group compounds are as described in the first embodiment.

A clay thin film is prepared by forming a thin film from an aqueous dispersion of the hydrotalcite group compound followed by drying. The aqueous dispersion should preferably contain 0.1 to 5% by weight of the hydrotalcite group compound. Below this concentration range, it would be difficult to form a uniform film. Beyond the range, a clay thin film would crack upon drying.

A thin film may be formed from the aqueous dispersion by any desired method of forming a uniform film, for example, a method of coating the dispersion on a support by dipping, spin coating, or casting. The support used herein may be made of glass, ceramics and resins. If heat treatment is subsequently done, the support should preferably be a heat resistant material capable of withstanding the heat treatment.

Preferably the clay thin film has a thickness of at least 0.1 μm. It is difficult with normal care to form a uniform film of less than 0.1 μm thick. The upper limit of the film thickness is not critical although it is usually up to 100 μm. There is a tradeoff between the fact that more of functional molecules are adsorbed as the film thickness increases and the fact that a thicker film of a large surface area tends to crack. Where it is desired to form a thicker film, the film should preferably be divided into sections of smaller surface area for preventing cracking. More particularly, in applications intended for optical disks, the support is formed with a spiral groove or concentric grooves where a thin film is formed. In applications intended for image display panels, the support is formed with recesses of rectangular or circular shape corresponding to respective picture elements and a thin film is formed in the recesses.

The thus formed clay thin film is comprised of an intercalation compound in which the hydrotalcite compound is the host and a guest species such as a carbonate ion is adsorbed between layers thereof, although some variations occur with a particular method of preparing a starting hydrotalcite compound. For allowing functional molecules to be adsorbed to the clay thin film, the clay thin film is contacted with a solution of functional molecules for guest exchange reaction.

If direct guest exchange reaction is difficult, the clay thin film is heat treated to exclude at least a part of the guest species such as carbonate ion. Heat treatment is preferably done at a temperature of 400 to 600° C. for about 1 to 5 hours. Exclusion of the guest species would be insufficient (and thus adsorption of functional molecules would be difficult) at lower temperatures or in shorter times. Higher temperatures or longer times are less desirable because the thin film or support can be stressed to induce cracking or stripping of the thin film. Also a choice of the support material is limited.

In the heat treated thin film, the hydrotalcite compound loses at least a part of the guest species and has a structure which has been partially changed due to pyrolytic decomposition.

Since the clay thin film is mainly comprised of the hydrotalcite group compound, it has very high transparency as demonstrated by an optical density of up to 1000 $cm^{-1}$ in the visible light range (wavelength about 400 to 800 nm).

A variety of functional molecules can be adsorbed to the clay thin film of this embodiment. Since the hydrotalcite group compound has anion adsorptivity, there can be adsorbed various anionic molecules, for example, molecules of various photosensitive materials such as photochromic materials, luminescent materials, photorefractive materials, photomechanical materials, PHB materials, and non-linear optical materials. Also neutral molecules can be adsorbed to the clay thin film. In this regard, anionic polar molecules must be once adsorbed to the clay thin film for expanding the spacing between layers thereof before neutral molecules can be adsorbed thereto.

In one typical example of functional molecule adsorption, anionic photochromic molecules are adsorbed to the clay thin film.

The anionic photochromic molecules are as described in the first embodiment. Preferred spiro-benzopyran compounds have been described in conjunction with formula (2) and Table 1.

When anionic photochromic molecules are adsorbed to the clay thin film, it is recommended to co-adsorb anionic polar molecules as an additional guest species.

The anionic polar molecules used herein are as described in the first embodiment.

Preferably the anionic photochromic molecules are adsorbed by the following method. First photochromic molecules and anionic polar molecules are added to water and dispersed or dissolved therein to form a reaction solution. The anionic polar molecules and photochromic molecules are mixed in such a molar ratio that the anionic polar molecules are excessive. In the reaction solution heated at about 40° to 80° C., the clay thin film is immersed for about 1 to 100 hours for allowing reaction to take place, that is, allowing photochromic molecules and anionic polar molecules to be co-adsorbed between layers of the hydrotalcite compound. The reaction is preferably carried out in an inert gas atmosphere. Finally, the clay thin film is separated from the reaction solution and dried.

The total amount of photochromic molecules and anionic polar molecules adsorbed in the clay thin film is about 0.1 to 3 meq/g.

Alternatively, the clay thin film is first immersed in an aqueous solution of anionic polar molecules for allowing the anionic polar molecules to be adsorbed between layers of the hydrotalcite compound, dried, and thereafter immersed in an aqueous solution of anionic photochromic molecules for allowing the photochromic molecules to be adsorbed between layers of the hydrotalcite compound.

It is possible to heat treat the clay thin film before anionic photochromic molecules are adsorbed thereto.

In another typical example of functional molecule adsorption, neutral photochromic molecules are adsorbed to the clay thin film. Preferred is a clay thin film in which both neutral photochromic molecules and non-polar molecules are guest species in the hydrotalcite group compound.

For adsorbing neutral photochromic molecules, a two-step method is preferred. In the first step, anionic polar molecules are inserted into the hydrotalcite group compound for expanding the spacing between layers thereof. In the following second step, neutral photochromic molecules and non-polar molecules as a solvent therefor are adsorbed between layers of the hydrotalcite group compound.

The neutral photochromic molecules are as described in the second embodiment. Preferred spiro-benzopyran compounds have been described in conjunction with formula (2) and Table 2.

It is difficult to directly insert a neutral spiro-pyran compound between layers of the hydrotalcite group compound. Thus in the first step, anionic polar molecules having a sulfone or similar group are intercalated for expanding the spacing between layers of the hydrotalcite group compound. Then in the second step, non-polar molecules and a neutral spiro-pyran compound are readily adsorbed. The first step must be followed by the second step. The anionic polar molecules once intercalated in the first step are at least partially replaced by the non-polar molecules and neutral spiro-pyran molecules in the second step. An intercalation compound exhibiting definite photochromism is obtained in this way.

In the first step, anionic polar molecules are added to water and dispersed or dissolved therein to form a reaction solution. In the reaction solution heated at about 40° to 80° C., the clay thin film is immersed for about 1 to 100 hours for allowing reaction to take place, that is, allowing anionic polar molecules to be adsorbed between layers of the hydrotalcite group compound. The reaction is preferably carried out in an inert gas atmosphere. The clay thin film may be heat treated as previously mentioned before immersion.

Next, the resulting intercalation compound thin film is separated from the reaction solution and dried before the second step is started. In the second step, neutral photochromic molecules are added to a solvent consisting of non-polar molecules and dispersed therein to form a reaction solution. Examples of the non-polar molecules are as described in the second embodiment.

Then the clay thin film having the anionic polar molecules adsorbed thereto is immersed in the reaction solution. Reaction is effected under substantially the same conditions as in the first step to perform guest exchange. Then photochromic molecules and non-polar molecules as the solvent are co-adsorbed between layers of the hydrotalcite compound in place of at least some of the anionic polar molecules. The resulting intercalation compound thin film is ready for use as a photochromic film in a wet state in the presence of the non-polar solvent. If desired, the intercalation compound thin film is separated from the reaction solution and dried.

The amount of anionic polar molecules adsorbed in the clay thin film in the first step is about 0.1 to 3 meq/g. The total amount of photochromic molecules and non-polar molecules adsorbed in the clay thin film in the second step is about 0.1 to 2 meq/g.

Formation of an intercalation compound can be ascertained by X-ray diffractometry, FTIR or the like, and the quantity of intercalation between layers can be measured by gas analysis, thermal analysis or the like.

All the starting materials, hydrotalcite group compound, neutral photochromic molecule, anionic polar molecule, and non-polar molecule can be prepared by conventional processes or are commercially available.

In the illustrated embodiments, a clay thin film is formed before functional molecules are adsorbed thereto. It is also contemplated herein that functional molecules are adsorbed to the hydrotalcite group compound through guest exchange in an aqueous dispersion of the compound before a thin film is formed from the aqueous dispersion.

EXAMPLE

Examples of the present invention are given below by way of illustration and not by way of limitation.

Example 1

Synthesis of hydrotalcite group compound

There were furnished Solutions A and B. Solution A was obtained by dissolving 8.0 grams of NaOH and 0.53 grams of $Na_2CO_3$ in 1 liter of distilled water. Solution B was obtained by dissolving 2.60 grams of $Mg(NO_3)_2$ and 1.60 grams of $Al(NO_3)_3$ in 50 ml of distilled water.

Solution B was added to Solution A at room temperature and agitated for 2 hours, obtaining a white precipitate. Using a centrifugal separator, the precipitate was separated from the solvent. The precipitate was washed three times with a liquid of the same composition as Solution A and then three times with distilled water, and dried over 24 hours at 80° C., obtaining a magnesium-aluminum hydrotalcite group compound in which carbonate ions were intercalated between layers. X-ray diffractometry showed a layer spacing of 8 Å.

The compound was then milled and calcined at 500° C. for 5 hours, obtaining a magnesium-aluminum hydrotalcite group compound ($Mg_{0.7}Al_{0.3}O_{1.15}$) which had been depleted of carbonate ions. X-ray diffractometry showed a layer spacing of 4 Å.

Preparation of photochromic material

To 50 ml of pure water were added 0.109 grams of the magnesium-aluminum hydrotalcite group compound synthesized above, $5.3\times10^{-3}$ grams of a spiro-benzopyran compound of formula (2) wherein X is H, $R^1$ is —$(CH_2)_3SO_3H.N(C_2H_5)_3$, $R^2$ is $NO_2$, and $R^3$ is H (SP-150 commercially available from Nippon Kankoh Sikiso Kenkyusho Co., Ltd.), and 0.046 grams of p-toluenesulfonic acid. The mixture was heated for reaction at 60° C. for 2 hours in a nitrogen atmosphere. There was formed a red reaction product which was separated from the solution and dried. Analysis of this reaction product by X-ray diffractometry showed that the magnesium-aluminum hydrotalcite group compound had a layer spacing expanded from 4 Å to 8 Å, which implied that it was an intercalation compound having the spiro-benzopyran compound and p-toluenesulfonic acid adsorbed thereto.

The intercalation compound was analyzed by fluorometry (excitation at 400 nm) to find a peak at 610 nm. When the red intercalation compound was held at 80° C. for 5 minutes, its color changed to yellow and a peak shift to 574 nm was found by fluorometry (excitation at 400 nm). Exposure of this yellow intercalation compound to ultraviolet radiation changed its color to red, ascertaining that the compound was reversible. It was also found that both the red and yellow states were stable over 3 hours.

For comparison purposes, a reaction product was prepared by the same procedure as above except that the p-toluenesulfonic acid was omitted. The reaction product was red and presumed from X-ray diffractometry to be an intercalation compound having the spiro-benzopyran compound intercalated between layers. Little color change was observed upon heating or ultraviolet radiation exposure.

Example 2

Preparation of photochromic material

Step I:

To 50 ml of pure water were added 0.1 gram of the magnesium-aluminum hydrotalcite group compound synthesized in Example 1 and 1 gram of p-toluenesulfonic acid. The mixture was heated for reaction at 60° C. for 2 hours in a nitrogen atmosphere. The reaction product was separated from the solution and dried. Analysis of this reaction product by X-ray diffractometry showed that the magnesium-aluminum hydrotalcite group compound had a layer spacing expanded from 4 Å to 8 Å, which implied that it was an intercalation compound having p-toluenesulfonic acid adsorbed thereto.

Step II:

To 2 ml of toluene were added 0.0211 gram of the intercalation compound resulting from Step I and 0.023 grams of a spiro-benzopyran compound of formula (2) wherein X is H, $R^1$ is $CH_3$, $R^2$ is $NO_2$, and $R^3$ is H (SP-1 commercially available from Nippon Kankoh Sikiso Kenkyusho Co., Ltd.). With ultrasonic agitation in a nitrogen atmosphere, the mixture was heated for reaction at 60° C. for 2 hours. The resulting reaction product was yellow color in a wet state and analyzed by fluorometry (excitation at 400 nm) to find a peak at 574 nm. Exposure of this yellow reaction product to ultraviolet radiation changed its color to red and a peak shift to 610 nm was found by fluorometry (excitation at 400 nm). Upon exposure to visible light (under a xenon lamp of 500 W), the red reaction product turned back to yellow, indicating that the compound was reversible.

The reaction product was separated from the solution and dried. Analysis of the product by X-ray diffractometry showed that the magnesium-aluminum hydrotalcite group compound had a layer spacing of 8 Å, which implied that it was an intercalation compound having the spiro-benzopyran compound and toluene adsorbed thereto.

It was also found that both the red and yellow states were stable over 3 hours.

For comparison purposes, the following experiments were carried out. The magnesium-aluminum hydrotalcite group compound and the spiro-benzopyran compound were added to methanol and maintained at the same reaction conditions as above, but no intercalation compound was formed.

Also, Step II was repeated under the same conditions except that methanol was used instead of toluene. There was obtained a red reaction product which was found to be an intercalation compound, but did not change its color to yellow upon exposure to visible light.

The magnesium-aluminum hydrotalcite group compound and the spiro-benzopyran compound were added to toluene. With ultrasonic agitation, reaction was effected for 5 minutes, obtaining a yellow reaction product in a wet state. This reaction product was found to be an intercalation compound and changed its color to red upon exposure to ultraviolet radiation. However, it sustained red color for less than one hour.

Example 3

There were furnished Solutions A and B. Solution A was obtained by dissolving 8.0 grams of NaOH and 0.53 grams of $Na_2CO_3$ in 1 liter of distilled water. Solution B was obtained by dissolving 2.60 grams of $Mg(NO_3)_2$ and 1.60 grams of $Al(NO_3)_3$ in 50 ml of distilled water.

Solution B was added to Solution A at room temperature and agitated for 2 hours, obtaining a white precipitate. Using a centrifugal separator, the precipitate was separated from the solvent. The precipitate was washed three times with a liquid of the same composition as Solution A and then three times with distilled water. Removal of water yielded a jelly solid containing fine particles of a magnesium-aluminum hydrotalcite group compound in which carbonate ions were intercalated between layers. The content of the hydrotalcite compound in the solid was determined to be 9% by weight by a drying method of drying at 800° C. for 6 hours followed by weighing.

An aqueous dispersion containing 1% by weight of the hydrotalcite compound was prepared using the solid and spread on a cleaned glass substrate by a dip coating technique. Drying at 60° C. for 5 hours yielded a transparent continuous thin film of about 2 μm thick. This thin film had an optical density of 100 $cm^{-1}$ at a wavelength of 400 nm. X-ray diffractometry showed a layer spacing of 8 Å. Absorption of visible light was maximum at 400 nm. The film thickness was measured by a step meter (DekTak) and the optical density measured by a VIS-UV spectrophotometer.

The thin film was heat treated at 450° C. for 3 hours. Transparency was maintained substantially unchanged, and neither thickness change nor stripping from the substrate occurred. The thin film as heat treated had an optical density of 200 cm$^{-1}$ at a wavelength of 400 nm. X-ray diffractometry showed that the compound was pyrolytically decomposed into a rock salt structure magnesium-aluminum oxide ($Mg_{0.7}A_{0.3}O_{1.15}$) which had been depleted of carbonate ions and had a layer spacing of 4 Å.

The heat treated thin film was immersed in a toluene solution containing 0.2 mM of a spiro-benzopyran compound of formula (2) wherein X is H, $R^1$ is —$(CH_2)_3SO_3H.N(C_2H_5)_3$, $R^2$ is $NO_2$, and $R^3$ is H (SP-150 commercially available from Nippon Kankoh Sikiso Kenkyusho Co., Ltd.), kept immersed therein at 20° C. for one hour in a nitrogen atmosphere, and dried. The toluene solution was clear. The thin film after drying was pale pink and its absorption spectrum showed an absorption peak near 350 nm. It was presumed that SP-150 was adsorbed to the thin film mainly as a colorless state. X-ray diffractometry showed a layer spacing of 4 Å.

The thin film was exposed to ultraviolet radiation at 254 nm for 5 minutes whereupon the film turned dark pink. Spectral analysis showed an increase of absorption near 540 nm. Definite photochromism was observed. Upon exposure to visible light (10 mW/cm$^2$) at 545 nm for 5 minutes, the film turned substantially transparent. It was found that the film was reversible between these states. It was also found that the dark pink and substantially transparent states were stable over 3 hours.

For comparison purposes, the thin film was immersed in a reaction solution and dried by the same procedure as above except that the reaction solution was prepared by dissolving SP-150 in ethanol as a polar solvent. The thin film was substantially transparent both after drying and after UV exposure. The absorption peak near 350 nm after drying and the absorption peak near 540 nm after UV exposure were not observed.

In another run wherein water was used as the solvent, the reaction solution was red and the thin film which was immersed in the reaction solution and dried was yellow, which indicated that SP-150 was adsorbed to the thin film mainly as a colorless state. However, the thin film showed only a little color change upon UV exposure, that is, no definite photochromism was found.

Example 4

There were furnished Solutions A and B. Solution A was obtained by dissolving 8.0 grams of NaOH and 0.53 grams of $Na_2CO_3$ in 1 liter of distilled water. Solution B was obtained by dissolving 2.60 grams of $Mg(NO_3)_2$ and 1.60 grams of $Al(NO_3)_3$ in 50 ml of distilled water.

Solution B was added to Solution A at room temperature and agitated for 2 hours, obtaining a white precipitate. Using a centrifugal separator, the precipitate was separated from the solvent. The precipitate was washed three times with a liquid of the same composition as Solution A and then three times with distilled water. Removal of water yielded a jelly solid containing fine particles of a magnesium-aluminum hydrotalcite group compound in which carbonate ions were intercalated between layers. The content of the hydrotalcite compound in the solid was determined to be 9% by weight by a drying method of drying at 80° C. for 6 hours followed by weighing.

An aqueous dispersion containing 1% by weight of the hydrotalcite compound was prepared using the solid and spread on a cleaned glass substrate by a dip coating technique. Drying at 60° C. for 5 hours yielded a transparent continuous thin film of about 2 μm thick. This thin film had an optical density of 100 cm$^{-1}$ at a wavelength of 400 nm. X-ray diffractometry showed a layer spacing of 8 Å. Absorption of visible light was maximum at 400 nm. The film thickness was measured by a step meter (DekTak) and the optical density measured by a VIS-UV spectrophotometer.

The thin film was heat treated at 450° C. for 3 hours. Transparency was maintained substantially unchanged, and neither thickness change nor stripping from the substrate occurred. The thin film as heat treated had an optical density of 200 cm$^{-1}$ at a wavelength of 400 nm. By this heat treatment, the compound was converted into a magnesium-aluminum oxide ($Mg_{0.7}Al_{0.3}O_{1.15}$) which had been depleted of carbonate ions and X-ray diffractometry showed a layer spacing of 4 Å.

The heat treated thin film was immersed in an aqueous solution containing a spiro-benzopyran compound of formula (2) wherein X is H, $R^1$ is —$(CH_2)_3SO_3H.N(C_2H_5)_3$, $R^2$ is $NO_2$, and $R^3$ is H (SP-150 commercially available from Nippon Kankoh Sikiso Kenkyusho Co., Ltd.), kept immersed therein at 60° C. for 24 hours in a nitrogen atmosphere, and dried. On spectral analysis, the thin film showed an absorption spectrum similar to that of SP-150 in aqueous solution, indicating that SP-150 was adsorbed to the thin film. X-ray diffractometry showed a layer spacing of 8 Å.

For comparison purposes, a thin film was similarly prepared from an aqueous dispersion containing 10% by weight of the hydrotalcite compound. After drying at 60° C. for 5 hours, the film was cracked and stripped from the substrate.

A thin film was similarly prepared from an aqueous dispersion containing 1% by weight of montmorillonite (KunipiaF commercially available from Kunimine Industry K.K.) or a clay mineral having cation adsorptivity. There was obtained a continuous thin film which was unsatisfactory in transparency as evidenced by white color and an optical density of 3000 cm$^{-1}$ at 400 nm.

The effectiveness of the invention from the first to the fourth embodiment is evident from the results of Examples.

We claim:

1. A method for preparing a thin film comprising a hydrotalcite compound comprising the steps of:

forming on a support a thin film from an aqueous dispersion containing a hydrotalcite group intercalation compound having a guest species between layers thereof, drying the film, and heat treating the film to exclude at least some of the guest species from between the layers.

2. The method for preparing a thin film of claim 1, wherein the aqueous dispersion contains 0.1 to 5% by weight of the hydrotalcite group intercalation compound.

3. The method of claim 1, wherein said thin film comprising a hydrotalcite compound has a thickness of at least 0.1 μm and an optical density of up 1000 cm$^{-1}$ in the visible light range.

4. The method of claim 1, wherein said support is selected from the group consisting of glass, ceramic a resin.

5. A method for preparing a thin film comprising a hydrotalcite compound comprising the steps of forming on a support a thin film from an aqueous dispersion containing a hydrotalcite group intercalation compound and drying the film.

6. The method of claim 5, wherein said thin film comprising a hydrotalcite compound has a thickness of at least 0.1 μm and an optical density of up to 1000 cm$^{-1}$ in the visible light range.

7. The method of claim 5, wherein said support is selected from the group consisting of glass, ceramic and a resin.

8. A method for preparing a thin film comprising a hydrotalcite compound comprising the steps of:

forming on a support a thin film from an aqueous dispersion containing a hydrotalcite group intercalation compound having a first guest species between layers thereof, drying the film, heat treating the film to exclude the guest species therefrom, and causing a second guest species to be adsorbed between layers of the hydrotalcite group compound.

9. The method of claim 8, wherein said thin film comprising a hydrotalcite compound has a thickness of at least 0.1 μm and an optical density of up to 1000 cm$^{-1}$ in the visible light range.

10. The method of claim 8, wherein said support is selected from the group consisting of glass, ceramic and a resin.

11. A method for preparing a thin film comprising a hydrotalcite compound comprising the steps of carrying out guest exchange in an aqueous dispersion containing a hydrotalcite group intercalation compound, forming on a support a thin film from the dispersion, and drying the film.

12. The method of claim 11, wherein said thin film comprising a hydrotalcite compound has a thickness of at least 0.1 μm and an optical density of up 1000 cm$^{-1}$ in the visible light range.

13. The method of claim 11, wherein said support is selected from the group consisting of glass, ceramic and a resin.

14. A method for preparing a thin film comprising a hydrotalcite compound comprising the steps of:

forming on a support a thin film from an aqueous dispersion containing a hydrotalcite group intercalation compound, drying the film, and causing anionic photochromic molecules and anionic polar molecules to be adsorbed between layers of the hydrotalcite group compound.

15. The method of claim 14 wherein the hydrotalcite group compound has a guest species between layers thereof, and after the drying step and before the adsorption step, the film is heat treated to exclude at least some of the guest species from between the layers.

16. The method of claim 14 wherein the photochromic molecules are spiro-pyran compounds.

17. The method of claim 14, wherein said anionic photochromic molecules are selected from the group consisting of azo dyes, indigo dyes, fulgides and spiro-pyran compounds, and wherein said anionic polar molecules are selected from the group consisting of aromatic and aliphatic sulfonic acids and aromatic and aliphatic carboxylic acids.

18. The method of claim 17, wherein said anionic polar molecules are selected from the group consisting of toluenensulfonic acid, naphthalene-sulfonic acid, benzenesulfonic acid, ethanesulfonic acid, propanesulfonic acid, naphthosulfonic acid, sulfanilic acid, benzoic acid and naphthoic acid.

19. The method of claim 14, wherein said thin film comprising a hydrotalcite compound has a thickness of at least 0.1 μm and an optical density of up to 1000 cm$^{-1}$ in the visible light range.

20. The method of claim 14, wherein said support is selected from the group consisting of glass, ceramic and a resin.

21. A method for preparing a thin film comprising a hydrotalcite compound comprising the steps of:

forming on a support a thin film from an aqueous dispersion containing a hydrotalcite group intercalation compound, drying the film, causing anionic polar molecules to be adsorbed between layers of the hydrotalcite group compound, and thereafter, causing neutral photochromic molecules and non-polar solvent molecules to be adsorbed between layers of the hydrotalcite group compound.

22. The method of claim 21 wherein the hydrotalcite group compound has a guest species between layers thereof, and after the drying step and before the first adsorption step, the film is heat treated to exclude at least some of the guest species from between the layers.

23. The method of claim 21, wherein said neutral photochromic molecules are selected from the group consisting of azo dyes, indigo dyes, fulgides and spiro-pyran compounds, and wherein said non-polar molecules are selected from the group consisting of benzene, toluene, xylene, cyclohexane, unsubstituted aliphatic hydrocarbons which are liquid at room temperature, halogenated aliphatic hydrocarbons which are liquid at room temperature, acetone and tetrahydrofuran.

24. The method of claim 21, wherein said thin film comprising a hydrotalcite compound has a thickness of at least 0.1 μm and an optical density of up 1000 cm$^{-1}$ in the visible light range.

25. The method of claim 21, wherein said support is selected from the group consisting of glass, ceramic and a resin.

* * * * *

UNITED STATES PATENT AND TRADEMARK OFFICE
CERTIFICATE OF CORRECTION

PATENT NO. : 5,576,055
DATED : November 19, 1996
INVENTOR(S) : Hideyuki Tagaya, et. al.

It is certified that error appears in the above-identified patent and that said Letters Patent is hereby corrected as shown below:

Column 18, line 57, after "ceramic" insert --and--.

Column 19, line 29, after "up" insert --to--.

Column 20, line 45, after "up" insert --to--.

Signed and Sealed this

Second Day of June, 1998

Attest:

BRUCE LEHMAN

Attesting Officer         Commissioner of Patents and Trademarks